United States Patent [19]

Parker et al.

[11] Patent Number: 4,643,789

[45] Date of Patent: Feb. 17, 1987

[54] METHOD FOR PREPARING A DECORATED INSERT AND CONTINUOUS INSERT MOLDING OPERATION

[75] Inventors: Harry A. Parker, Murray Hill; Joseph Greenman, Plainfield, both of N.J.

[73] Assignee: Transfer Print Foils, East Brunswick, N.J.

[21] Appl. No.: 576,605

[22] Filed: Feb. 3, 1984

Related U.S. Application Data

[63] Continuation-in-part of Ser. No. 401,275, Jul. 23, 1982, abandoned.

[51] Int. Cl.[4] ............... B44C 1/16; B32B 31/00; B31F 1/00; B29C 45/00
[52] U.S. Cl. ..................... 156/219; 156/233; 156/238; 156/240; 156/257; 156/245; 264/510
[58] Field of Search ............ 156/201, 230, 245, 361, 156/232, 240, 540, 541, 241, 239, 219, 196, 238, 249, 257, 267, 277, 233; 264/510, 516, 511, 509

[56] References Cited

U.S. PATENT DOCUMENTS

| | | | |
|---|---|---|---|
| 2,391,539 | 12/1945 | Avery | 156/259 |
| 2,523,234 | 9/1950 | Rado | 156/232 |
| 2,817,619 | 12/1957 | Bickel et al. | 156/232 |
| 3,108,850 | 10/1963 | Brandt | 264/509 |
| 3,166,186 | 1/1965 | Karn | 206/56 |
| 3,292,209 | 12/1966 | Borkmann | 425/126 |
| 3,801,689 | 4/1974 | Langecker | 156/232 |
| 3,816,207 | 6/1974 | Robertson et al. | 156/238 |
| 4,059,471 | 11/1977 | Haigh | 156/277 |
| 4,153,496 | 5/1979 | Swift | 156/267 |
| 4,181,551 | 1/1980 | Ward | 156/245 |
| 4,202,663 | 5/1980 | Haigh et al. | 8/471 |
| 4,213,926 | 7/1980 | Toyoda et al. | 156/240 |
| 4,235,657 | 11/1980 | Greenman et al. | 156/240 |
| 4,236,955 | 12/1980 | Prittie | 156/353 |
| 4,263,027 | 4/1981 | Rampelberg | 156/238 |
| 4,359,358 | 11/1982 | Hattemer | 156/277 |
| 4,379,017 | 4/1983 | Barta | 156/238 |
| 4,418,033 | 11/1983 | Hatakeyama | 264/509 |
| 4,568,403 | 2/1986 | Egan | 156/249 |

Primary Examiner—Edward Kimlin
Assistant Examiner—Louis Falasro
Attorney, Agent, or Firm—David A. Jackson

[57] ABSTRACT

A method is disclosed for the preparation of a thermoformable transfer film that may be pre-cut or is pre-positioned for continuous application during the forming of plastic articles by an insert molding decorating technique. A carrier film is first bonded to the transfer film from which the transfer is prepared, to form a composite. The composite is then printed with appropriate decorating indicia on the free surface of the transfer film component thereof. Printing may be single-stage or multi-stage, depending upon the indicia desired, and a subsequent metalization of the transfer film may be performed.

The fully printed composite is then indexed into position and thermoformed to form the insert which later may be indexed directly into the mold chamber. The insert may be die-cut after its formation or prior to thermoforming.

The present method facilitates the decoration of insert molded products in a manner which eliminates the need for conventional insert molding.

23 Claims, 8 Drawing Figures

METHOD FOR PREPARING A DECORATED INSERT AND CONTINUOUS INSERT MOLDING OPERATION

CROSS-REFERENCE TO RELATED APPLICATION

The present application is a continuation-in-part of copending application Ser. No. 401,275 filed July 23, 1982, by the inventors herein, abandoned.

BACKGROUND OF THE INVENTION

1. Field of the Invention

The present invention relates to a method for decorating and molding three dimensional plastic articles by a technique similar to in-mold decoration.

2. Description of the Prior Art

The decoration of a variety of molded products by the application of decorating indicia to the product during the molding process, i.e., the technique of in-mold decorating, is well known. Such techniques are practiced by feeding into the mold in which the product is to be formed, a strip having one or more decorating indicia thereon. Thus, the strip would be indexed into position so that the decoration would be aligned with the intended location on the products, after which the product would be molded against the decoration. Thereafter the transferred decoration would be appropriately severed from the remainder of the strip and trimmed to complete the fabrication of the product.

The standard in-mold decorating technique possessed a variety of drawbacks to its use, particularly in high speed, continuous molding. For example, the hot transfer bearing the decorating indicia has to exceed the indicia in size, with the result that the quantitites of plastic film utilized per decoration were unnecessarily great.

Also, the disposition of additional plastic film on the final product detracted from its appearance.

Efforts to remove excess plastic film from the decoration could only be directed to post-molding operations, as pre-cutting or punching of the strip would result in the failure during the molding process due either to collapse of the strip or malalignment of the decoration with the molded product. Likewise, attempts to remove excess film from the molded product frequently result in tearing or other fracturing of the remaining indicia, or damage to the product itself, so that a high rate of rejects would develop.

The prior art with respect to in-mold decorating is exemplified by U.S. Pat. Nos. 4,059,471 to Haigh, and 4,202,663 to Haigh, deceased et al. These patents speak in passing of in-mold decoration, but concern themselves primarily with the transfer of a dye from a transfer sheet, through a polyolefin film, to a thermoplastic sheet. This is accomplished by the application of heat and pressure, causing the dye to sublime through the film and into the plastic sheet.

Similarly, U.S. Pat. No. 3,292,209 to Borkmann, and U.S. Pat. No. 3,816,207 to Robertson et al. illustrate variant apparatus utilized to the practice of transfer decoration. Borkmann is noted for its effort to develop an apparatus to practice a method disclosed in U.S. Pat. No. 3,108,580 to Brandt, wherein labels are indexed into position, and a blow-molded parison in the semi-molten state is then inflated thereagainst and heat fused thereto. Borkmann illustrates by its complexity the intricacy and precision of the apparatus that must be utilized in accordance with the prior art, to assure alignment of the decoration with the product being molded.

The criticality and complexity of in-mld decorating techniques has militated against their use in the preparation of complex decorations of the type that are now of interst to the packaging field. For example, complex decorations are now desirable for products that may include as many as three or four divergent indicia, including photographic facsimiles of a broad range of colors, appropriately trimmed with a metalized layer. The preparation of this type of complex, compound decoration requires the use of techniques such as multiple-stage printing by screen printing techniques and the like, all of which is time consuming and expensive due to the criticality in the alignment of the images of the respective components of the decoraton.

During the course of the development of the present invention, the inventors investigated the use of pre-cutting the hot transfer stock, and determined that such pre-cutting would further complicate any efforts to utilize the film for continuous in-mold decoration. In particular, the pre-cutting of the stock, either in whole or in part, resulted in failure, as the decorated portions of the stock would dislodge and could not be retained in alignment, particularly at the commercial speeds of operation of an in-mold decorating procedure.

Further investigations revealed that the area of die-cutting of transfer items was well known, but was limited in its application to pressure sensitive labels. Representative prior art patents on die-cutting, comprise U.S. Pat. Nos. 2,391,539 to Avery, 3,166,186 to Karn and 4,236,955 to Prittie. All three patents deal primarily with pressure-adhesive label stock that is disposed on a peel-away base and is appropriately die-cut by perforations or full cutting, so that the labels may be easily removed from the base for application to the intended substrate, without preliminarily adhering to themselves or to other objects before use.

Efforts to apply die-cutting techniques to plastics generally have met with failure. Particularly in the instance where the plastic films are measured in thicknesses of 3 to 10 mils, the tolerance of most die-cutting equipment is such that one cannot guarantee that the cutting edge will not strike through the first film and into the second or carrier film, and in some operations, it is this strike-through that would result in the same difficulty that one would experience if a single film were die-cut by perforation or otherwise. Clearly, then, the die-cutting techniques familiar to the label making art were investigated, and initially found to be unable to meet the rigid tolerances and requirements of the hot transfer industry.

The initial solution to the aforenoted problem was developed and disclosed in parent application Ser. No. 401,275, incorporated herein by reference, wherein a carrier film was prepared as a laminate bearing the intended decoration, and was then carefully die cut. Thereafter, the unwanted portion of the transfer was stripped away and the resulting carrier film was indexed into a mold wherein the decoration was hot transferred to the final plastic article. This technique is a radical departure from the plastic decorating techniques of the prior art as it successfully utilized the continuous die-cutting of a heat transferable indicia to facilitate continuous in-mold transfer decoration.

Recently, the present inventors have considered applying the methodology discussed above to three-dimensional products that are manufactured by insert molding. Insert molding involves the preparation of a thermoformable base to which a decorative surface such as a metallized layer is usually laminated, after which the base is shaped by heat and pressure to form the shell of the ultimate product. The shell is usually indexed into either an injection molding or blow molding chamber or the like, where the remainder of the final plastic article is formed against the underside of the shell.

The application of the earlier disclosed in-mold transfer technique to insert molding presents complications as critical alignment is necessary between the transfer and the insert in the mold that would be difficult to achieve and maintain on a commercial scale. The only apparent alternative in the case of insert molded products is to rely on the prior art techniques of individual alignment of the hot transfer in the mold with the insert, however, this technique is time consuming and understandably commercially impractical.

A need therefore exists for the development of a technique that facilitates the continuous decoration of insert-molded products, and if possible, that takes advantage of the in-mold decorating technique earlier developed by the present inventors.

SUMMARY OF THE INVENTION

In accordance with the present invention, a method for preparing a die-cut decorated film useful in a continuous insert molding operation has been developed. The method comprises forming a composite, such as a laminate, of a thermoformable carrier film useful in hot-transfer decorating processes, and a thermoplastic resinous transfer film which is to serve as the substrate for the decoration, decorating, thermoforming, and in some instances, thereafter die cutting the transfer film on its carrier to form the final insert. The transfer film may be die cut either before, during or after it is thermoformed, and may even be die cut in or after leaving the molding chamber.

The initial preparation of the carrier and the transfer film may be conducted as a lamination under heat and pressure, or by the coating of the carrier by a solution of the transfer film. The decorating indicia are then printed on the composite, on at least a portion of the free surface of the transfer film. The indicia may be applied in a single printing step, or in multiple steps in the instance of compound or complex indicia, and may be placed in regularly spaced-apart disposition. A plurality of identical indicia may thus be disposed on an elongated strip of the composite. The printing step may include the initial application of colored indicia in the same register, followed by an over-plating or application of metalized dress.

In some instances, the decorated composite may be die-cut after the application of decorating indicia is complete. Die cutting may be conducted in a controlled manner, so that the die fully penetrates the thickness of the transfer film without penetrating the surface of the carrier film. In other instances, however, where a foraminous insert is desired, die cutting may include punching out and discarding portions of both films.

After die cutting is complete, the unwanted portion of the transfer film may be stripped away if desired, leaving the decorated portions of the transfer film situated on the continuous carrier film. In the instance where die-cutting precedes thermoforming, the transfer film may then be indexed into a thermoforming apparatus, wherein heat and pressure are applied to form the transfer film into a three-dimensional shell or insert. Thereafter, the shell or insert remaining on the carrier, may be indexed into the molding chamber where the remainder of the final product is formed. Final product formation may be accomplished by injection molding, blow molding, or other forming techniques amenable to adaptation to insert molding operations.

In an alternate embodiment, the carrier bearing the decorated transfer film may first be thermoformed and thereafter die-cut to remove unwanted material. In this embodiment, die-cutting may take place either in the thermoforming chamber or thereafter in or even beyond the molding chamber for the final product.

The carrier film of this invention may be of any thickness, however should be selected from vacuum formable thermoplastic materials also useful in hot-transfer processes and exhibiting no elastic memory, such as polyesters, polycarbonates, and cellulose derivatives. The film may be transparent or translucent and may be 0.5 mil in thickness or greater, depending upon the shell or insert to be prepared. Suitable thermoplastic resins comprise vinyl polyers, such as polyvinylchloride, modified polyurethanes, acrylic polymers, and cellulose esters, such as cellulose acetate.

When performed, lamination of the carrier film and the transfer film may take place at speeds of up to 200 feet per minute by passage of the two films through the nip of heated rollers. The resulting laminate may then be printed, either by a single or a multiple printing sequence, the latter in the instance where a plurality of colors or color combinations are desired. At the same time, indexing marks may be disposed on the transfer film, to assure alignment for the later thermoforming, die-cutting and insert molding operations.

In the instance where multiple colors are applied, followed by a metalized dress, it is preferable to apply a sizing coat after the metalized dress. Sizing coats may be selected from a variety of compositions, including polyurethanes, polyolefins, acrylic and vinyl polymers. In such instance, it is desirable to apply the sizing coat to the entirety of the surface of the transfer film.

Die-cutting wherever performed is accomplished by indexing the decorated composite into appropriate position, with the aid of the indexing marks applied during the printing step. In the instance where die cutting of the transfer film alone is critical, die hardnesses, bevels and temperatures are carefully controlled to assure that the cutting edge penetrate fully through the transfer film, but does not penetrates the surface of the carrier film. Among the parameters mentioned is the use of a heated die with beveled cutting edges, that operates against a chilled anvil. A critical aspect of this embodiment of the die-cutting sequence, is the need to continually remove the unwanted portions of the film, known as the "skeleton" both from the carrier film and from any interstices of the die in which portion of the "skeleton" may have lodged. The "skeleton" may be removed from the laminate by passage thereof through idler rolls and take up of the skeleton thereat.

The final product emerging from the mold, has placed in perfect alignment thereon, the desired decoration. With the exception of instances where post-molding die-cutting is desirable and practical, there is no need for post-treatment of the product, such as trimming etc. of the decoration to remove excess portions of the hot transfer, as the decoration is an integral part of the insert or shell. The resulting decoration correspondingly possesses improved appearance.

The present combined decorating and molding operation may be run continuously and at comercially desirable speeds, thereby rendering such techniques economically attractive. The decorated hot-transfer prepared in accordance with the present invention is likewise economical, as it can be prepared with relatively simple equipment and with a reduced number of operations. Also, the present technique is capable of replacing insert molding as a separate operation.

Accordingly, it is a principal object of the present invention to provide a method for the preparation of decorated hot-transfer materials for application in continuous insert molding decorating operations.

It is a further object of the present invention to provide the method as aforesaid, wherein the decorated hot-transfer materials may be prepared from relatively thin layered plastic materials that may be die-cut prior to being hot transferred.

It is a still further object of the present invention to provide a method for continuously performing in-mold decoration of insert molded products.

It is a still further object of the present invention to provide methods as aforesaid that is of simple and economical operation.

Other objects and advantages will become apparent to those skilled in the art from a review of the ensuing description which proceeds with reference to the following illustrative drawings.

DETAILED DESCRIPTION

Figure 1:
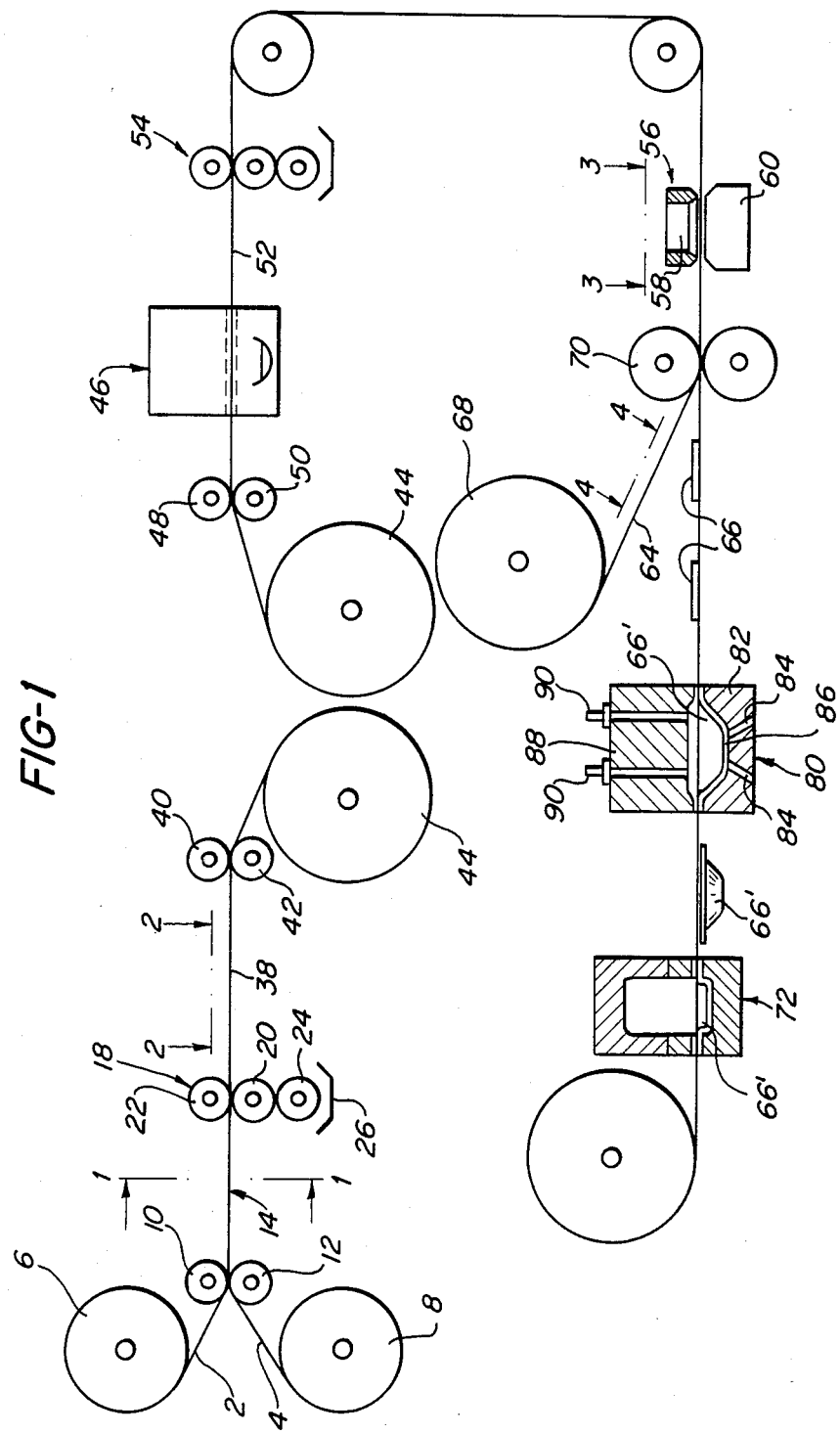
FIG. 1 is a schematic plan view sequentially illustrating the steps of the present method.

In its broadest aspect, the method of the present invention comprises the preparation of a composite of a thermoformable carrier film and a thermoplastic resinous transfer film, the transfer film to serve as at least part of the outer surface and shell of a plastic article during the subsequent molding thereof. In one embodiment, the composite comprises a laminate of the two films to each other, as discussed later on herein and with reference to the attached Figures.

The formed composite is provided with printed indicia on the exposed surface of the transfer film, after which it is thermoformed to the shape of the shell or insert. The transfer film may be die-cut either before, during or after thermoforming or after molding to isolate the decorated portions of the transfer film from those unwanted portions of the transfer film, known as the "skeleton". The skeleton may be peeled away if desired, leaving the decorated portions of the transfer film adhesively bound to the carrier film. In the instance where die cutting precedes molding, the carrier film is then indexed into alignment within the mold for the plastic articles, so that a combined continuous in-mold decoration and insert molding of the formed plastic articles may take place.

The carrier films useful in accordance with the present method, comprise those films capable of undergoing thermoforming and retaining the formed shape. This latter ability is based on the absence of the property of elastic "memory", which enables those resinous films possessing the same to resume their original shape after a period of time. Accordingly, the carrier films useful herein are not intended for reuse as in our earlier parent application.

Additionally, the carrier film should be capable of undergoing exposure to various printing techniques, including vacuum metalization. Suitable materials include films prepared from the materials selected from the group consisting of polyester resins, polycarbonate resins, cellulose derivatives, including cellulose esters and ethers and their copolymers. In particular, the polyesters may include polyethylene terephthalate; polycarbonates may include acrylonitrile-butadiene-styrene resins; and the cellulosic derivatives include cellulose acetate, celluse acetate butyrate, ethyl cellulose and viscose, known as "cellophane", with cellulose acetate preferred. The carrier film may vary in thickness from about 0.5 mil upwards, and preferably, from about 3 mils upwards. A range of 0.5 mil to about 7 mils is exemplary, The exact thickness of the carrier film will vary with the processing of the transfer film, and the specific thermoforming and final molding techniques to be used and the article to be prepared.

The transfer film must likewise be thermoformable and may comprise a thermoplastic resinous material selected from the group consisting of vinyl resins, modified polyurethane resins, acrylic homo- and copolymers, polyolefin resins, including substituted and unsubstituted resins, and the like. More specifically, the vinyl resins include polyvinylchloride, polyvinylacetate, polyvinyl alcohol and copolymers thereof; the acrylic polymers include polyacrylates, such as polymethylmethacrylate; polyolefins include polyethylene, polypropylene, polystyrene and the like; and polyurethanes include Bisphenol A-epichlorohydrin derivatives, and the like. The transfer film is preferably transparent, but may be translucent and provided with appropriate coloration, to achieve different visual effects. The transfer film may vary in thickness, for 0.5 mil upward, in similar fashion to the carrier film, depending upon the plastic article to which the transfer film is to be adhered. A thickness ranging from 1 to 3 mils is exemplary.

Lamination of the transfer film to the carrier film may be conducted by simple heat and pressure. Alternately, the transfer film may be applied to the carrier film as a cast or roller coated liquid, and thereafter dried and cured within the scope of the invention. Referring now to FIG. 1, the pressure bonding of the carrier and transfer film is illustrated, and accordingly the carrier film 2 and the transfer film 4 may be payed out from respective reels 6 and 8 and brought together between the nip of pressure rollers 10, 12 to form the laminate 14 illustrated sectionally in FIGS. 2 and 3.

Figure 2:
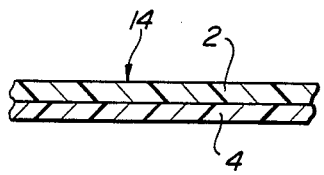
FIG. 2 is a sectional view taken through Line 1—1 of FIG. 1, showing an initial composite formed in accordance with one embodiment of the present invention.

Referring now to FIG. 2, the laminate may be formed by the application of heat and pressure at the nip of rollers 10, 12 to achieve releasable surface bond between carrier film 2 and transfer film 4. For example, rollers 10, 12 may be heated to a temperature ranging from about 180° to about 350° F., and may be adjusted to impose a pressure upon carrier film 2 and transfer film 4 of between 40 psi and 100 psi. The temperature would be instantaneously applied at pressure rollers 10, 12 and the respective films 2 and 4 would pass between the nip of the rollers at speeds of up to about 200 feet per minute on a commercial scale.

Figure 3:
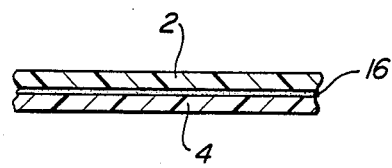
FIG. 3 is a sectional view similar to FIG. 2 showing a variant laminate in accordance with the present invention.

Referring now to FIG. 3, an alternate laminate 14 is shown. In this instance, the carrier film 2 has been provided with a suitable room temperature, releasable adhesive coating, labeled 16, that would retain carrier film 2 and transfer film 4 in contact with each other throughout the following processing, but would release upon either the exertion of mechanical tension, by the stripping of the "skeleton", discussed hereinafter, or by the application of the heat generated by either the thermoforming of the insert or the later formation of the final product. Suitable materials to serve as the releasable adhesive would include certain thermoplastic monomers and polymers, including cellulose esters and ethers and vinyl compounds. For example, nitrocellulose may be utilized as the adhesive release coating. The coating may be applied in a thickness of less than one mil, and would be disposed as shown in FIG. 3.

In a preferred embodiment of the invention, the composite or laminate 14 may comprise a combination of an approximately 2 mil thick polyester carrier film, to which a roughly 1 mil thickness transfer film has been "piggy backed". Naturally, the foregoing thicknesses are illustrative only, and are not intended to limit the present invention.

Figure 4:
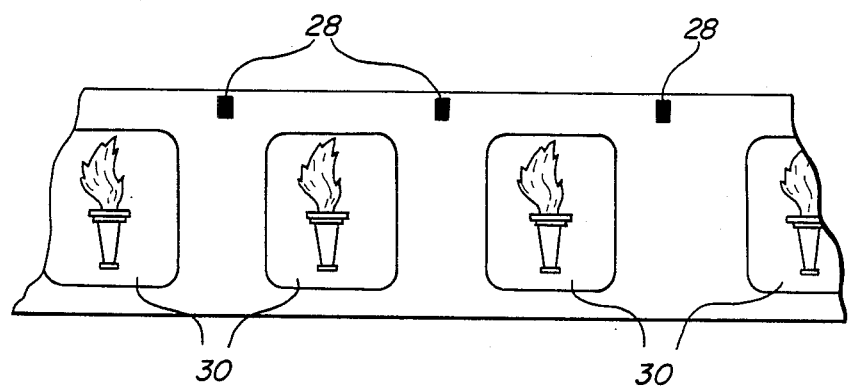
FIG. 4 is a top plan view in the area of Line 2—2 illustrating the placement of indexing marks in accordance with the present invention.

After its formation, the composite may be appropriately printed with the desired decorating indicia. Referring to FIG. 1, a typical printing station 18 is illustrated, which may comprise a printing roller 20 cooperating with a idler roll 22 and an ink supply roller 24 transferring a thin film of ink from a reservoir 26. Printing roller 20 would have appropriately disposed thereon the pattern of the desired indicia, so that the desired decoration is disposed on the free surface of transfer film 4. Referring briefly to FIG. 4, in the instance where die-cutting and resulting pre-trimming of the individual decorated portions of transfer film 4 are desired, appropriate indexing indicia or indexing marks 28 may be printed upon the transfer film 4 during the printing operation to aid in the alignment of the composite during die cutting. Thus, as shown in FIG. 4, an indexing mark 28 is disposed in regularly spaced disposition with respect to decorating indicia 30.

Referring further to FIG. 4, the decorating indicia 30 may be regularly spaced with respect to each other as well as with respect indexing marks 28, to permit the sequential indexing into the mold of the laminate 14, thereby assuring alignment and accurate transfer of indicia 30 during the molding sequence.

The dimensional accuracy of the decorated insert and its position in the final product is a function of its alignment in the vacuum forming chamber during the thermoforming operation described herinafter. The importance of the indexing mark 28 in this added capacity can also be appreciated.

Figure 5:
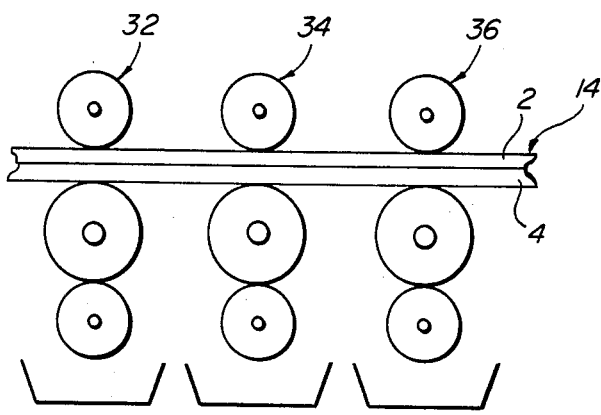
FIG. 5 is an enlarged schematic sectional view similar to the region defined by Line 2—2 in FIG. 1, showing a multiple printing station in accordance with an embodiment of the present invention.

Referring now to FIG. 5, an alternate printing station is shown, to facilitate the application of sequential, divergent colors, patterns, etc., to form a composite decoration. As illustrated, regularly spaced printing stations 32, 34 and 36 are disposed to receive the composite or laminate 14. Printing stations 32, 34 and 36 carry individual patterns, and/or colors so that color or pattern blends may be applied in overlying fashion to blend or complement each other. The printing inks, etc. applied to the surface of transfer film 4 may be of the variety that dry on contact, so as to avoid "bleeding" of the various colors between adjacent printing stations, in the instance where printing rollers are utilized. As printing may be applied by means other than pressured application, such as jet printing, screen printing etc., "bleeding" may pose no problem.

One of the aspects of multiple color printing, is that, in accordance with the present invention, a technique known as "reverse printing" must be utilized. That is, in the instance where a substrate is printed with a multiple color decoration, the sequence of color application is such that the last-applied color is that which forms the uppermost portion of the decoration. In the instance where, however, the decoration is applied to the underside of a film, this order must be reversed, so that "reverse printing" must be utilized. Accordingly, printing station 32 as illustrated would apply the uppermost color and indicia, with printing stations 34 and 36 respectively applying intermediate and base colors and indicia in overlying relationship to each other. In this way, when the composite decoration is applied to the surface or substrate of the plastic article, the respective layers of printing or color will be appropriately positioned.

Referring further to FIG. 1, the printing operation frequently includes the disposition of a metalized coating as a "base" portion of the decoration. Thus, the decoration may include a border and lettering. Frequently, one or more colors are applied by the techniques described above, with appropriate areas left unprinted, to account for the later application of a metalized layer, to define either or both the border of the decoration and the lettering thereon. Naturally, selective printing of colors may vary to suit the specific effect desired in the decoration, so that the invention is not limited to the disposition of the metalized effect in any specific position. The foregoing is therefore illustrative only.

Referring again to FIG. 1, in the instance where a metalized coating is to be applied, the printed composite 38 is passed through appropriate idler rolls 40, 42 and wound up on a take up roll 44. Thereafter, take up roll 44 is payed out and passes through an appropriate metalizing station 46, illustrated schematically herein, so that the surface of composite 38 having printing already thereon, is disposed in position to receive the metalized coating. Idler rolls 48 and 50 are illustrated but are optional.

Metalization may be accomplished by conventional techniques, such as vapor deposition. The present invention does not relate to the specific manner in which metalization is accomplished, and therefore the techniques of vapor deposition of metal as known in the art, may be utilized herein, and such techniques are incorporated herein by reference.

As known in the art, a number of metals may be applied by vapor deposition to form a tightly adherent, continuous coating. Such metals would include both precious and non-precious metals, such as gold, silver, tin, zinc, chromium and aluminum. For example, aluminum may be and is conventionally applied, by deposition to a thickness that may range, for example, up to about 400 Angstroms. The exact thickness of the layer is discretionary and may accordingly vary. In similar fashion, the previous description with regarding to printing contemplates a variation in the thickness of the respective color coatings, with thicknesses on the order of 1 or 2 mils standard.

In the instance where a metalized coating is applied, it is advisable to likewise apply a sizing coating before the resulting metalized composite 52 is die-cut. Referring again to FIG. 1, the sizing coat may be applied by coating roller station 54, to a thickness that may likewise vary to a few microns. The sizing compositions useful in accordance with the present invention, include vinyl polymers, acrylic polymers, polyolefins such as polyethylene, and polyurethanes. The sizing coat is applied to assure the integrity of the metalized coating through thermoforming and die-cutting, to thereby prevent edge fracture. In the further event that the sizing coat as applied, reduces adhesion of the ultimate decoration, a wash or tie coat of a material such as chlorinated rubber may be applied in a thickness of less than one mil. The application of the wash coat, however, is purely optional, and depends upon the conditions and applications to which the decorated composite is exposed during the insert molding process.

After the coating of transfer film 4 is completed in any of the variations described above, the resulting decorated composite may be indexed into position for die-cutting in accordance with one embodiment of the invention. As will be described with reference to FIG. 8 later on herein, die-cutting may be delayed and performed either at thermoforming or thereafter, during or after final molding.

Figure 6:
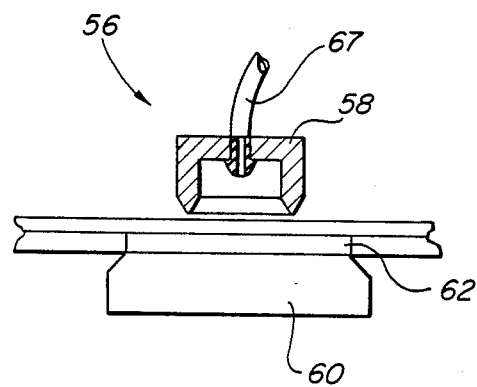
FIG. 6 is an enlarged schematic view taken through Line 3—3 of FIG. 1 showing a representative die-cutting station in accordance an embodiment with the present invention.

Referring now to FIGS. 1 and 6, an appropriate die-cutting station 56 is shown, comprising cutting edge 58 adapted to impact transfer film 4, and anvil 60 located adjacent the free surface of carrier film 2. Upon the positioning of the laminate within station 56, cutting edge 58 and anvil 60 are brought together, conventionally by the movement of cutting edge 58, to cause an incision to be formed that passes through the entire thickness of transfer film 4, taking care not to penetrate the underlying adjacent surface of carrier film 2. This type of criticality may be desirable when the outer margin of the insert is being cut.

As mentioned earlier, the exact construction and operation of die station 56 is critical to the accomplishment of one embodiment of the die-cutting operation. Specifically, die-cutting station 56 as shown in FIG. 6, may comprise, in addition to cutting edge 58 and anvil 60, bearing surfaces 62, which serve to limit the motion of cutting edge 58, to assure that the travel of cutting edges 58 is stopped short of penetration of carrier film 2. The provision of carrier film 2 in the sizes mentioned earlier, requires that the bearing surfaces 62 must be prepared to exacting tolerances, and from materials of critical harness, to assure dimensional stability in operation.

In similar fashion, cutting edges 58 must be of critical hardness to assure sharpness and dimensional stability during high speed, commercial operation, so that complete penetration of transfer film 4 without penetration of carrier film 2, is uniformly achieved. Thus, for example, cutting edges 58 may be appropriately beveled at acute angles, and may be provided with hardened outer surfaces, by chrome plating, etc. to assure dimensional stability and uniformity of resulting operation.

Other features of the die-cutting stations 56, illustrated in FIG. 6, includes an ejector means 67, disposed adjacent cutting edges 58, to assure that any unwanted portions of transfer film 4 that might be retained by cutting edges 58 after the cutting operation, are appropriately removed, to avoid clogging and breakdown of cutting station 56. This would be appropriate in the instance where the final transfer material assumes a doughnut shape, and, correspondingly that a central portion of the transfer film 4 must be individually removed. Ejection may be accomplished by air pressure, vacuum, or mechanical means, not shown. The choice of specific ejection means is not critical to the present invention, and may vary within the scope thereof.

As discussed earlier, die cutting may be performed in certain cases to completely remove a portion of the composite entirely, such as where a foraminous end product is contemplated. Examples of such products are certain automotive trim pieces, where other hardware must desirably protrude from the formed part. In such instance, the die cutting station may include a punch or stamping member, not shown, that would cut completely through both the carrier and the transfer film to form the desired opening. Such punching apparatus is known, and would include vacuum or positive air pressure means to clear the punched out portion of the composite from the remainder of the insert. This equipment is described in compliance with the duty to disclose the best mode of the practice of the invention, but in other respects, is considered within the skill of the art and does not per se form a part of the invention.

Figure 7:
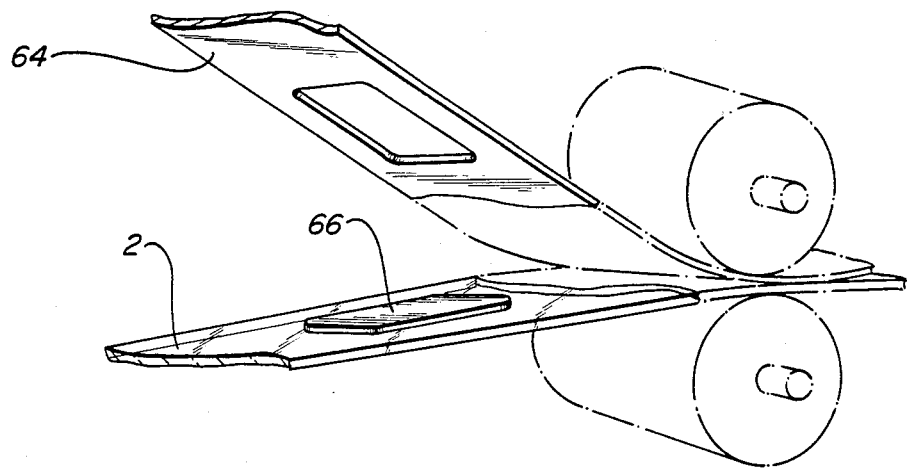
FIG. 7 is a perspective taken at Line 4—4 of FIG. 1, showing the skeleton and resulting laminate at the point of their separation from each other.

Upon completion of the die-cutting operation, the resulting decorated transfer material as illustrated is now separated from the unwanted portion of transfer film 4, known as the skeleton. Referring now to FIG. 7, the removal of the skeleton 64, leaving carrier film 2 bearing completed decorated transfer material 66, is illustrated in fragmentary perspective. Skeleton 64 may be drawn off to an appropriate take off reel 68, as shown schematically in FIG. 1, as the die-cut laminate passes an appropriate idler roller 70. Thus, the die-cut transfer material 66 is retained in position along carrier film 2.

Alternately, die cutting could be conducted and the insert could participate in a molding operation before the skeleton is removed. The present invention contemplates this variation within its scope.

In accordance with the embodiment illustrated in FIG. 1, transfer material 66 is then thermoformed to form product insert or shell 66'. The transfer 66 indexes into a thermoforming station illustrated schematically at 80. Station 80 may comprise a vacuum forming chamber with a lower positioned female die half 82 bearing one or more air outlet lines 84 to permit the evacuation of the portion of the chamber between die half 82 and the transfer film 66. Die half 82 defines a smooth female shaping surface 86 against which the transfer film and its carrier will be urged.

The upper die half 88 of chamber 80 may provide means for the introduction of heat to bear against the transfer film 66 to soften it and assist in urging it toward the female shaping surface 86. Inlet lines 90 are schematically depicted which may for example introduce a heated inert gas to impinge against transfer film 66 to cause it to soften and thereby aid its movement toward female shaping surface 86. Upon completion of thermoforming, transfer film 66 assumes the shape of at least a portion of the final three-dimensional article, and appears as insert or shell 66' as illustrated, which is now ready for final molding.

The foregoing explanation and illustration of vacuum forming is provided in general terms and for purposes of illustration only, as the exact details of the apparatus and procedures used in vacuum forming are known in the art and do not, per se, form a part of the present invention. Also, vacuum forming is but one technique of thermoforming of plastic materials, and the present invention includes other techniques such as hot stamping and blow molding within its scope.

Referring further to FIG. 1, insert 66' is released from thermoforming station 80 and may then be introduced into an appropriate mold assembly labeled 72 and shown schematically in FIG. 1, wherein the insert molding of the final plastic article may take place.

The technique of in-mold decorating is known in the art, and reference made to U.S. Pat. Nos. 4,202,663 and 4,059,471, respectively, to the selected portions thereof, dealing with in-mold decoration. The present decorating process is distinguishable, in that the entire decorated transfer material 66 is formed into an insert 66' which is permanently bonded to the remainder of the formed article, when the mold is closed, additional plastic material is introduced and appropriate heat and pressure are applied. It should be kept in mind that this technique is considered a variation of the in-mold decorating technique disclosed in our parent application.

Figure 8:
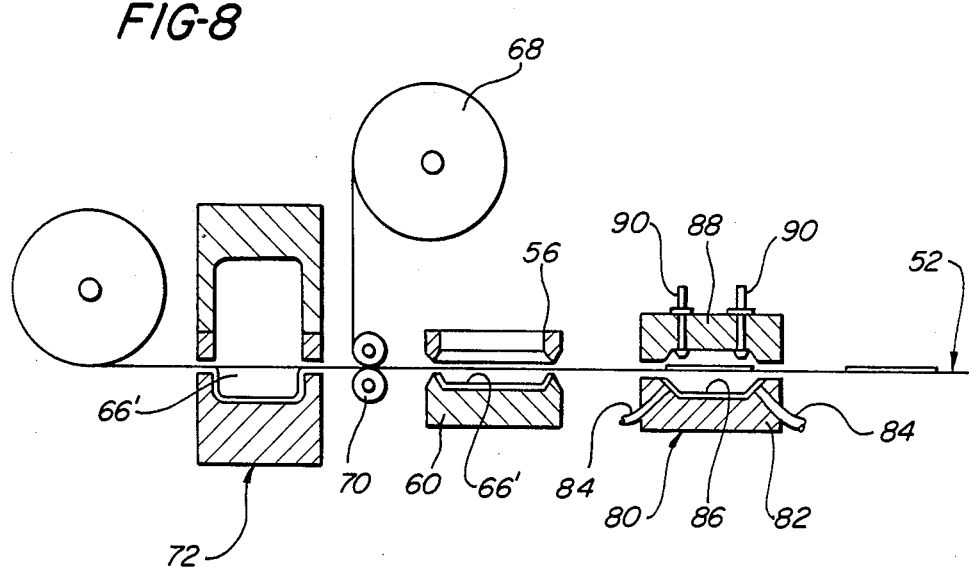
FIG. 8 is a schematic plan view similar to FIG. 1 illustrating a sequence of operations in accordance with an alternate embodiment of the invention.

In an alternate embodiment of the invention illustrated schematically in FIG. 8, the transfer film 66 may be die-cut at a different stage and corresponding location than as described earlier. Thus, for example, the initial laminate 52 may be indexed directly upon its formation to the thermoforming station 80 whereupon shell or insert 66' would be formed.

Die cutting of the shell or insert 66' could then take place at one of four exemplary locations: in first and second instances, die-cutting station 56 may be combined in construction with either the thermoforming station 80 or the mold assembly 72; in a third instance, die cutting station 36 may be located between the two as illustrated in FIG. 8; and, in a fourth instance, die cutting station 56 may be located beyond mold assembly 72, so that removal of excess film may take place after the final product has been fully formed. The exact location of the die cutting station could therefore vary.

The in-mold decoration and final product forming techniques utilized in accoradnce with the present invention, may vary depending upon the plastic articles and their method of manufacture. Thus, for example, as illustrated in the aforementioned '663 and '471 patents, the plastic articles may comprise sheets, blocks or the like that are hot stamped into final shape, or appropriate parisons that are placed in a mold cavity and thereafter blown to form hollow articles. In each instance, the carrier film bearing the decorated transfer or insert material may be indexed into the mold cavity, with the printed indicia positioned to lie adjacent the outer surface of the molded plastic article, whereupon the transfer material and the adjacent surface of the plastic article are forced into pressured contact and joined with each other, at an elevated temperature sufficient to effect a permanent bond therebetween. An apparatus suitable for the performance of a type of in-mold decorating, is also disclosed in U.S. Pat. No. 3,292,209 to Borkmann, and the disclosure thereof is accordingly incorporated herein be reference as illustrative.

It can therefore be seen that the advantage of the present invention is that a continuous strip of preformed and/or pre-cut decorated inserts may be prepared so as to easily index into alignment for application to plastic articles on a continuous basis in accordance with insert molding techniques. As the present method facilitates the exact positioning of the decorated transfers upon the carrier film, multiple coatings are easily and inexpensively performed, and post-treatment of the decorated plastic articles can be eliminated.

The invention may be embodied in other forms or carried out in other ways without departing from the spirit or essential characteristics thereof. The present disclosure is therefore to be considered as in all respects illustrative and not restrictive, the scope of the invention being indicated by the appended claims, and all changes which come within the meaning and range of equivalency are intended to be embraced therein.

What is claimed is:

1. A method for continuously preparing decorated three-dimensional molded articles consisting essentially of:
    A. forming a laminated composite from a thermoformable organic resinous carrier film used in hot-transfer decorating process and having a thickness of from 0.5 mil to 7 mil, and a printable thermoplastic transfer film, said transfer film having a thickness of from 0.5 mil to 3 mil;
    B. printing at least one decorating indicia on said composite, on at least a portion of the free surface of said thermoplastic transfer film;
    C. thermoforming said composite by applying deformation heat and pressure to form an insert bearing said decorating indicia defining at least a portion of the outer surface of the final three-dimensional molded article;
    D. die-cutting said insert, wherein at least a portion of said die-cutting is performed in a controlled manner to fully penetrate the thickness of said transfer film without penetrating the adjacent surface of said carrier film;
    E. indexing said insert into a molding chamber and forming the remainder of said molded article thereagainst, and
    F. separating the decorated molded article from said carrier film.

2. The method of claim 1 wherein said die-cutting step is performed within the mold chamber wherein the insert molding of Step E takes place.

3. The method of claim 1 wherein the composite of Step B is first thermoformed, and said die cutting step is performed on the resulting insert.

4. The method of claim 1 wherein said carrier film is selected from the group consisting of thermoformable polyester resins, polycarbonate resins, and cellulose derivatives.

5. The method of claim 4 wherein said carrier film is selected from the group consisting of cellulose acetate, cellulose acetate butyrate, ethyl cellulose and cellophane.

6. The method of claim 1 wherein said thermoplastic transfer film is thermoformable and is selected from the group consisting of vinyl resins, modified polyurethane resins, acrylic homopolymers, acrylic copolymers, and polyolefin resins.

7. The method of claim 6 wherein said thermoplastic transfer film is selected from the group consisting of polyvinylchloride, polyvinylacetate, polyvinyl alcohol, homopolymers and copolymers thereof; polyacrylates, polymethacrylates, homopolymers and copolymers thereof; polyethylene, polypropylene, polystyrene, homopolymers and copolymers thereof; substituted polyurethanes, and unsubstituted polyurethanes.

8. The method of claim 1 wherein said thermoplastic transfer film ranges in thickness from about 1 mil to about 3 mils.

9. The method of claim 1 wherein a plurality of decorating indicia are printed on said composite in regularly spaced-apart relationship to each other.

10. The method of claim 9 wherein said composite comprises a continuous strip and an indefinite number of indentical decorating indicia are printed thereon.

11. The method of claim 10 wherein said printing step includes the printing on said thermoplastic transfer film of at least one indexing mark, in spaced relation to said decorating indicia, to serve as a guide for the alignment of said composite during said thermoforming and die-cutting steps.

12. The method of claim 11 wherein a plurality of indexing marks are printed on said thermoplastic transfer film, in regularly spaced relation to each other and to said decorating indicia, so that each of said decorating indicia may be properly aligned for said thermoforming and die-cutting steps.

13. The method of claim 12 wherein said decorating indicia is printed in a single color and in a single printing pass.

14. The method of claim 12 wherein said decorating indicia is printed in a plurality of different colors.

15. The method of claim 14 wherein said different colors are applied in a single printing pass.

16. The method of claim 14 wherein said different colors are applied sequentially at regularly spaced printing stations.

17. The method of claim 16 wherein said different colors are applied in reverse fashion with the color intended to appear outermost being applied first.

18. The method of claim 13 further including applying a layer of vaporized metal to at least a portion of said decorating indicia.

19. The method of claim 18 wherein, subsequent to the application of said layer of vaporized metal, a sizing coat is applied thereon.

20. The method of claim 19 wherein said sizing coat is selected from the group consisting of polyurethane resins, acrylic resins, vinyl resins and polyolefin resins.

21. The method of claim 1 wherein said die-cutting is performed by pressing an appropriately configured cutting die against the surface of said composite defined by said thermoplastic transfer film, while steadying said composite against a supporting anvil.

22. The method of claim 1, wherein said die-cutting step is performed under a temperature gradient, with heat applied to said thermoplastic transfer film through said cutting edge, while reduced temperature is applied to said carrier film through said anvil.

23. The method of claim 1 wherein said die-cutting step is performed after the molding step of Step E.

* * * * *